US006830256B2

(12) United States Patent
Bryant

(10) Patent No.: US 6,830,256 B2
(45) Date of Patent: Dec. 14, 2004

(54) METHOD AND APPARATUS FOR REBOUND CONTROL

(76) Inventor: Peter E. Bryant, P.O. Box 370 806, Las Vegas, NV (US) 89137

( * ) Notice: Subject to any disclaimer, the term of this patent is extended or adjusted under 35 U.S.C. 154(b) by 137 days.

(21) Appl. No.: 10/100,313

(22) Filed: Mar. 16, 2002

(65) Prior Publication Data

US 2003/0173754 A1 Sep. 18, 2003

(51) Int. Cl.[7] .............................................. B60G 15/07
(52) U.S. Cl. ..................... 280/124.106; 280/124.154; 267/194; 267/225
(58) Field of Search ................... 280/124.106, 124.104, 280/124.154, 124.155, 124.145, 124.146, 124.147; 267/194, 221, 225, 252

(56) References Cited

U.S. PATENT DOCUMENTS

| 2,160,541 A | 5/1939 | Du Bonnet | |
| 2,260,634 A * | 10/1941 | Mullner | 267/225 |
| 2,408,254 A * | 9/1946 | DuPont | 267/221 |
| 2,902,274 A * | 9/1959 | McIntyre | 267/221 |
| 3,049,359 A | 8/1962 | Geyer | |
| 3,297,312 A | 1/1967 | Hines | |
| 3,830,517 A | 8/1974 | McNeill | |
| 4,406,473 A * | 9/1983 | Sexton | 267/225 |
| 5,183,285 A | 2/1993 | Bianchi | |
| 5,263,695 A | 11/1993 | Bianchi | |
| 6,017,044 A | 1/2000 | Kawagoe | |
| 6,220,406 B1 | 4/2001 | de Molina et al. | |
| 6,273,441 B1 | 8/2001 | Neavitt et al. | |
| 6,491,292 B2 * | 12/2002 | Stumm et al. | 267/225 |

FOREIGN PATENT DOCUMENTS

FR    2271456 A  *  1/1976  ............. F16F/3/00

* cited by examiner

*Primary Examiner*—Peter C. English
(74) *Attorney, Agent, or Firm*—Aaron Passman

(57) ABSTRACT

A stabilizing apparatus and method that replaces the existing shock absorber of a road vehicle that works to resist the initiation of body roll during cornering. It seeks to counter act the forces being generated by the vehicle suspension springs that exacerbate the rollover propensity of vehicles during certain steering maneuvers.

6 Claims, 4 Drawing Sheets

GRAPH OF LOAD PATHS OF 320 POUND PER INCH RATE COMPRESSION JOUNCE SPRING AND 160 POUND PER INCH RATE COUNTER SPRING. SHOWING HOW THE REBOUND SPRING EFFECTS THE REBOUND TRAVEL OF THE SUSPENSION WHEN IT ENGAGED AT 1" OF JOUNCE.

NOTE: THERE IS NO CURVE AT THE TRANSITION POINT ( 1" OF JOUNCE).

METHOD AND APPARATUS FOR REBOUND CONTROL

CROSS REFERENCE TO RELATED APPLICATIONS

This application is related to:

U.S. Ser. No. 09/803,505 filed on Mar. 9, 2001 entitled Opposing Spring Resilient Tension Suspension System.

U.S. Ser. No. 10/033,016 filed on Oct. 26, 2001 entitled Opposing Spring Rebound Tension Suspension System.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to and, in particular, to improvements in the methods and apparatus for using a rebound spring carried on a shock absorber that is intended to utilize the unsprung weight of the wheel/axle system during rebound. More particularly, it is to resist rollover, sway, yaw and other chassis motion.

2. Description of Related Art Including Information Disclosed Under 37 CFR 1.97 and 1.98

In the past ten years the numbers of sport utility vehicles "SUV" and pickup trucks have increased dramatically to the point where those vehicles are more popular than the millions of passenger cars on the road. The SUV and trucks inherently have a higher center of gravity (CG) than normal passenger cars due to the need for higher ground clearance for bad weather travel (snow and ice), off-road use and/or for pickup truck payloads. Vehicles with a higher CG have a greater propensity to sway or even rollover during abrupt lane changes and evasive steering maneuvers than the lower normal passenger cars.

One important arrangement of all these vehicles is the method of suspension used. Except for the use of hydraulic shock absorber damping resistance to rebound, all vehicle chassis and body loads are supported on the vehicle axles with various types of suspensions that have springs that resist primarily load and jounce of each wheel axle. No existing suspensions using coil springs, load leaf springs, air springs, torsion bars or rubber blocks suspensions have any other provision for rebound control of the forces due to inertia or gravity type negative suspension loads. Particularly, those rebound forces occurring at the inside wheel during hard cornering or if a wheel drops into a pothole.

Typically, changes in suspension loads while driving straight along a road are caused generally by reactions to bumps, potholes, and roughness encountered by the vehicle wheels during their interaction with the road surface. Thus the suspension springs and associated shock absorbers quell the harshness and movements being transmitted to the body/chassis.

The sway or side to side rolling motions that vehicles experience due to cornering forces, also cause vehicle springs to be loaded or unloaded, depending which way the vehicle is rolling during cornering. Many vehicles have an anti-sway/roll bar installed to help the vehicle body resist the rolling actions. These devices help the vehicle partially resist roll but only as it relates to the body lean, because they are fixed to the sprung mass and leaning with the body. Thus, they can actually reduce the load on the unloaded side of the vehicle. They use the body as a structure to support the torsion bar of the anti sway system transferring wheel jounce motion across to the opposite side. The disclosure herein will obviate the need for anti-sway bars, saving the cost of providing and installing them. Shock absorbers only dampen the bouncing movement of the vehicle wheels and suspension caused by the reaction to road surface, cornering and braking. Thus, the rate of sway may be affected only to a minor degree.

A floating aluminum piston is placed between the fluid moving piston and the end of the shock body. The floating piston has nitrogen gas behind it that is at a preset pressure. This piston is used in racing shocks and other lift type shocks to do two things, first to pressurize the fluid at all times and second to raise the vehicle ride height. It is not practical to fill the entire shock body with fluid on both sides of the fluid piston. This ensures that as the fluid moving piston moves away from the end of the cavity as it would during extension or "rebound" travel, it does not permit a vacuum to form behind the fluid piston and sucking against the shock travel. It maintains a pressure front against the fluid to ensure that it is induced to pass the fluid piston during jounce travel. The fluid piston has holes in it to allow the fluid to pass by it and flexible shims on both sides of the fluid piston are adjusted in strength to set the resistance to flow through the piston during normal movement. Stiffer shims result in higher resistance to the fluid being compressed against them.

All this and the use of nitrogen pressure against the piston are typical of existing shock absorber design. The basic tubular shock absorber is well known to skilled artisans, and is a commodity and is disclosed in numerous patents. The typical shock absorber is designed to dampen motion and with coil over springs adjust the ride height and/or spring stiffness.

U.S. Pat. No. 2,160,541 has a paired spring suspension connected in series to only support load and jounce with the added spring coupled in line with the main spring for increasing the effective spring constant at the extremes of suspension travel. The techniques disclosed in the various embodiments of '541 are in the nature of an overload spring that engages and changes the spring constant at the extremes of wheel travel. There is no spring in '541 connected to specifically resist rebound forces due to diverging motion of the sprung weight to unsprung weight. The disclosure of '541 specifically states that the higher spring constant results in less flex (on page 2 column 1 at lines 6 to 8), " . . . which opposes any tendency of the vehicle to overturn laterally when negotiating a curve." In each embodiment of '541 the springs act in unison to control primarily load and jounce and there is no teaching of a particular connection to directly apply rebound reaction of unsprung weight to one of the springs. The graph in '541 showing wheel travel verses spring forces verifies these conclusions. U.S. Pat. No. 5,263,695 discloses a refinement of the '541 teaching that includes a shock absorber for damping motion and an elastic block to ameliorate the transition between first and second springs for carrying the load. In addition to many disclosures in '695 of prior paired spring configurations there is a specific explanation in column 5, lines 1 through 5 as follows:

"The suspension according to the invention produces a comfort level which is higher the more the transition from one stiffness to the other takes place progressively (see the patents cited in the state of the art)."

The state of the art referred to includes prior patents of the same inventor and the acknowledgements of those prior patents clearly identifies the teachings as merely two springs of different stiffness in series. Even in FIG. 7 of '695 the springs are concentrically mounted but act in series, see column 4, lines 8 through 12. At best the structures for multiple springs shown in these patents have differing spring rates to give an allegedly more comfortable ride but do not specifically disclose rebound control.

U.S. Pat. No. 3,830,517 is a motorcycle rear wheel spring suspension wherein a top spring is longer and absorbs upward road shock and a bottom spring absorbs the rider's weight. Nothing is disclosed about resisting rebound with either the top or bottom spring and no attachment of the springs is shown or described that would operate to control rebound of the sprung weight.

U.S. Pat. No. 3,049,359 has a pair of coaxial coil springs designed to maintain ride height by automatic screw adjustment of the smaller and lighter inner tension coil spring. No disclosure of rebound control of sprung weight is made and the inner tension coil spring loadings are varied only in so far as the ride height is less or more than required as such the size and strength of the inner tension spring would be insufficient to transfer the unsprung weight to the chassis and resist rebound. Moreover the working travel of both springs appears to be the same; thus, no rebound control is possible.

No existing suspension system suspends the chassis and/or body between opposing springs to counter load and jounce and reaction and rebound along different portions of the axle and wheel travel. An opposing spring suspension as disclosed herein can have little effect on the ride stiffness, but stabilizes cornering and evasive maneuvering sway by utilizing the unsprung weight of the axle system thus helping the vehicle to resist roll while maintaining the general ride quality.

U.S. Pat. No. 3,297,312 has a combination shock absorber and spring for automobile suspensions. Close examination reveals that a main rod connects between a top cap and a nut to bottom tube. It appears that the rod will bottom out against the tube end when the springs are compressed because rod 52 is of set length and incompressible. The four springs stacked, as a unit, abut each other to act as one continuous variable rate spring. Specifically, the upper two springs have a disc that separates them that shifts up and down with the movement of the springs. The disc has valve holes in it to permit the movement of fluid to each side of the disc to act as a shock absorber. This appears to have minimal effect or use.

U.S. Pat. No. 5,183,285 has a suspension of a stiffness that is greater between the operating load position and the suspended wheels position than between the operating load position and the collapsed position. It is a suspension and a suspension process that uses a greater stiffness in the region of "rebound" than in the region of "bump" with means for smoothing the stiffness from the passage of one region to the other, and means for varying the reference position for "operating load" as a function of the number of persons and the load in the vehicle. A suspension wherein the stiffness is greater in the region between the position "operating load" and a position "suspended wheels" than in the range between the position "operating load" and a position "collapsed suspension" up to shock abutment. The suspension has stiffness greater in the region of "rebound" than in the region of "bump"; if these are graphically represented, a change of thickness represented by a break in the slope appears. FIGS. 13, 14 and 16 in U.S. Pat. No. 5,183,285 have a rebound spring around a shock positioned by a jack for varying the reference position for "operating load" as a function of the number of persons and the load in the vehicle. The jack varies the preload position so there is no gap between rebound and bump.

U.S. Pat. No. 6,273,441 has a load leaf spring suspension system with an elongated stabilizing spring mounted there above the axle. The added spring communicates roll resistance to the vehicle axle at its top center section. Force is concurrently applied at the ends of the stabilizing spring to the leaf spring of the vehicle by shackles. Adjustment of the device is achieved by use of a plurality of mounting apertures for the shackles located at varying distances from the center of the stabilizing spring thereby allowing for adjustment by the user for desired performance characteristics. Further force adjustment is achieved with one or a combination of an optional axle spacer located at the center section of the stabilizing spring to communicate with the axle. This stabilizer system does not employ opposing spring technology.

An influence is delivered on the vehicle center of gravity by opposing spring. The center of gravity of the unsprung mass relative to the center of gravity of the sprung mass is affected during the cornering maneuvers. Without a tension or opposing spring to "tether" the sprung mass to the unsprung mass the unsprung mass does not initially help resist the movement upwards of the sprung mass. This resistance is best appreciated in a vehicle with very heavy unsprung mass relative to a lighter sprung mass during corn ring versus a vehicle with light unsprung mass relative to a heavy sprung mass. The former is recognized as undesirable and the latter is greatly preferred and sought after in design of vehicles. Often the physical limits of the vehicle components determine the practical boundaries of the sprung weight to unsprung weight ratio. The disclosure herein has an approach to ameliorate the dynamics of that relationship.

U.S. Pat. No. 6,017,044 has as it's main thrust regulation of spring rebound and bound. Vertical downward jacking-force characteristics of the front suspension is set to be stronger relatively with respect to vertical downward jacking-force characteristics of the rear suspension during cornering. This is achieved by two means. The first is the use of a very strong bump rubber in FIG. 3 of U.S. Pat. No. 6,017,044 that comes into play at the extreme end of the front jounce travel. This bump rubber is not needed in our disclosure. Second, a short "spring" item in FIG. 4 of U.S. Pat. No. 6,017,044 is intended to help control "jack up" of the rear suspension occurring near the extreme end of the roll. The working distance traveled is very short.

U.S. Pat. No. 6,220,406 discloses a damper for reducing sway. It discloses background on various types of shock absorbers used in connection with motor vehicle suspension systems to absorb unwanted vibrations that occur during various driving conditions. To dampen the unwanted vibrations, shock absorbers are generally connected between the sprung portion (i.e., the vehicle body) and the unsprung portion (i.e., the suspension) of the vehicle. A piston assembly is located within the working chamber of the shock absorber and is connected to the body of the motor vehicle through a piston rod. Generally, the piston assembly includes a primary valve arranged to limit the flow of damping fluid within the working chamber when the shock absorber is compressed or extended. As such, the shock absorber is able to generate a damping force to smooth or dampen the vibrations transmitted from the suspension to the vehicle body. Typically, these vibrations occur from forces generated in a vertical direction between the vehicle body and the driving surface.

The greater the degree to which the flow of damping fluid within the working chamber is restricted across the piston assembly, the greater the damping forces that are generated by the shock absorber. It is also possible to implement a primary valve arrangement that produces one magnitude of damping on the compression stroke, and a second magnitude of damping on the rebound stroke. These different damping rates are typically constant as varying the sizes of the compression and rebound bypass orifices produces them.

While these shock absorbers produce ride comfort levels ranging from "soft" to "firm," few, if any, of the known shock absorbers produce varying degrees of damping in a passive manner. The shock absorber systems in use are capable of producing varying degrees of damping force; typically achieve this through the use of active control systems. These systems generally react to the vertically generated forces placed upon the vehicle suspension.

Accordingly, in '406 a shock absorber that includes a primary damping mechanism for counteracting the vertical forces placed upon the vehicle, and a secondary damping mechanism which is capable of providing varying damping in response to horizontal and lateral forces that are placed upon the vehicle suspension. Secondary and variable damping is provided in proportion to the lateral force encountered by a passive control or valves arranged to implement a passive anti-roll system for enhancing the control to the vehicle provided by the vehicle suspension. While such a passive damping system also eliminates the need for complicated and expensive controls to actively provide the varying degrees of damping, it is not easily adapted to the large variety of vehicles and their suspensions.

The problem of the lateral forces placed upon the vehicle suspension is they are generated during high-speed cornering. As the suspension and tires counteract these lateral forces, a rolling action on the vehicle body is produced. When these rolling forces exceed the limit for the vehicle, a rollover condition may be created wherein the vehicle is literally flipped over on its side. Accordingly, it is desirable to provide a shock absorber that provides increased resistance in response to these lateral and horizontal forces for counteracting or at least minimizing these rolling forces and the lift associated therewith.

BRIEF SUMMARY OF THE INVENTION

In the disclosed device and method, a rebound spring is placed to resist the lengthening of the shock absorber from a position that starts one inch into jounce travel from normal ride height to the full rebound suspension travel position. This rebound spring is opposing and resisting the forces that are generated when the suspension is unloading as for example during cornering. Namely the forces caused by the vehicle suspension spring trying to return to its free position and the centrifugal forces naturally resulting during cornering.

Using an additional coil spring mounted about the shock absorber to resist the rebound motion of the sprung weight applied by movement thereof away from the design height reduces chassis roll. The shock absorber thus reduces the initiation of rebound travel between the sprung and unsprung weights as the vehicle becomes lighter due to dynamic forces inducing roll or lift of the chassis and vehicle body.

The transitory effects of body roll during cornering flex the load springs on the side of the vehicle following the outside of the turn due to increased transfer weight to that side. Meanwhile the springs on the side of the vehicle, following the inside of the turn, unload extending toward their free position using the axle as a location for inducing lift of the sprung weight on that side resulting in increased body roll. Roll or sway during sudden cornering or evasive maneuvers rotates the vehicle and its center of gravity "CG" around the Roll Center axis.

The Roll Center axis is a function of the particular vehicle's suspension geometry. Roll or sway is increased if the vehicle center of gravity is raised as in a SUV, four-wheel drive vehicle or truck. A sudden turn opposite the direction of vehicle travel can cause momentum to continue the sway of the vehicle forcing its center of gravity to move laterally past its maximum upright position, and so the vehicle continues on rolling and overturns.

The solution, as disclosed herein, may include an added rebound spring mounted coaxial about the shock absorber tube to act primarily to resist rebound of the suspension from the design height position and thereby apply resistive force to the chassis via the shock absorber to reduce lift. The coil rebound spring can also be added to a strut type suspension for exactly the same purpose. It is an advantage of the present invention that it can be easily and inexpensively added as an after market supplement to either the front or rear of an existing vehicle suspension with tubular shock absorbers. It is a further advantage of the present invention that the coil rebound spring has very little influence on ride height and/or ride stiffness.

The coil rebound spring works from one inch of jounce travel all the way to full rebound travel of the shock absorber. It works to prevent the onset of roll from the design height, rather than limiting the roll to a certain amount after it has rolled a certain amount. Limiting the roll from the design height position serves to reduce the momentum or inertial weight gain that occurs at the initiation of roll and continues after roll has begun. In other words, we seek to eliminate as much roll as possible from the outset. Rebound control overlaps the jounce control; therefore the disclosed system is truly bi-linear, a preferred embodiment.

DETAILED DESCRIPTION OF THE INVENTION

Figure 1:
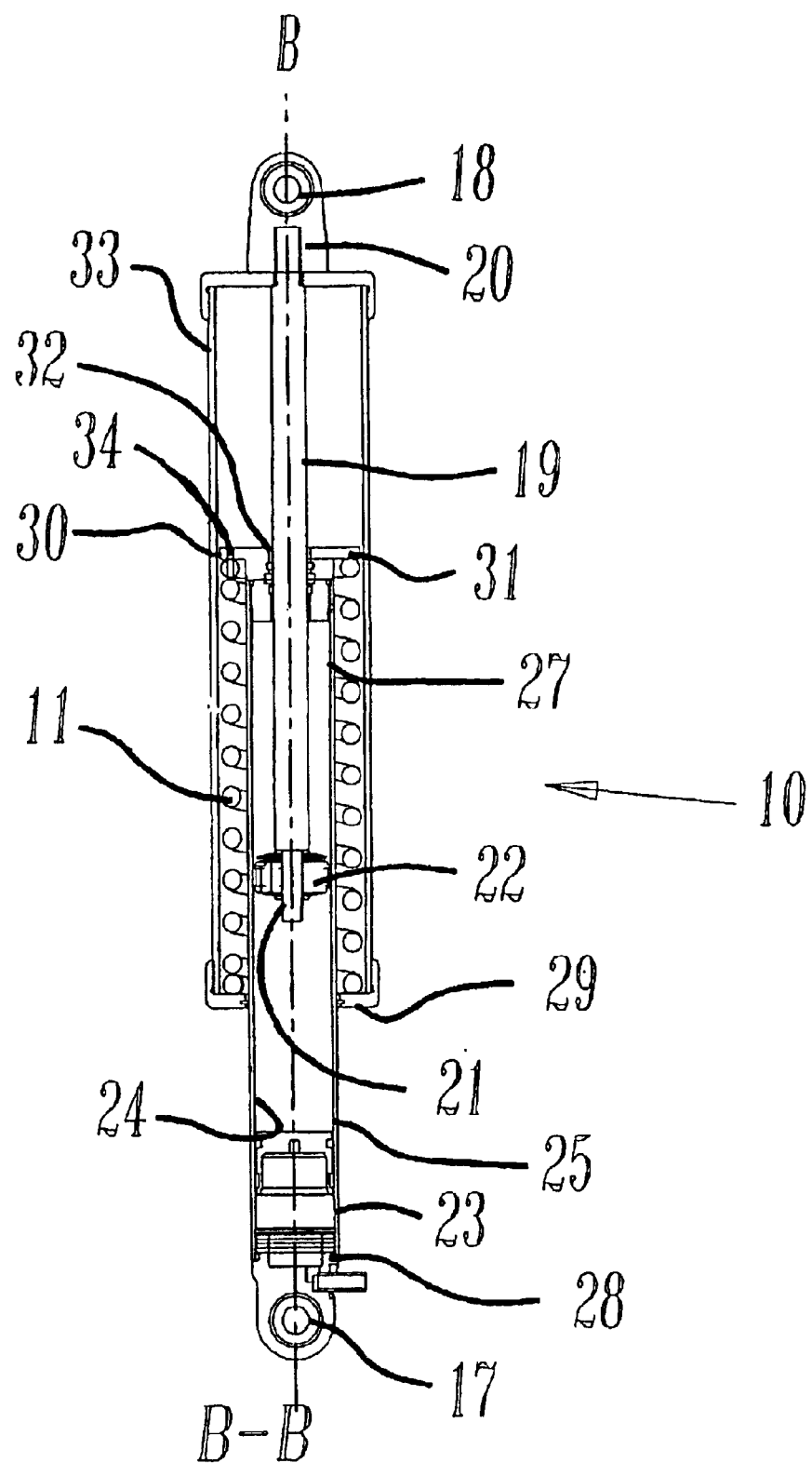
FIG. 1 is a side view in cross section of a shock absorber having a coil rebound spring thereabout.

FIG. 1 shows a cross section view of a vehicle rebound control shock absorber 10 with a special suspension coil rebound spring 11 arrangement. It is to be used to replace a standard shock absorber installation independent of the vehicle spring system, as is commonly found in both vehicles with leaf type and coil type suspension spring systems. Commonly a shock absorber connects the sprung mass to the un-sprung mass and is used only to dampen unsprung mass oscillations induced by bumpy roads and sometimes with helper load springs for preloaded height and jounce improvement. The sprung mass is carried on vehicle chassis and body and herein after will be referred to structurally as chassis 16. The unsprung weight is that which is not supported by the vehicle suspension spring system, i.e. axles 15, wheels, tires, brake assemblies and suspension components that hang downwardly if the body is lifted. Typically, the passenger vehicle has four wheels with associated suspension with two at the front and two at the rear. The disclosure herein is to cover any number of axle 15 and wheel combinations so long as there is roll to be restrained.

FIG. 1 shows a coil spring mounted about a rebound control shock absorber 10 for exerting force to resist upper rebound control shock absorber 10 movement from the normal design height or preloaded ride position of chassis 16. When both ends of the rebound control shock absorber 10 are pulled apart, as experienced by chassis 16 when it lifts during rebound of the axle 15. It is called coil rebound spring 11 because it is intended to counter the lifting action of the vehicle suspension during roll due to cornering maneuvers. When a vehicle corners, its chassis 16 rolls about its longitudinal axis A—A in FIG. 2 relative to axles 15. Load carrying coil springs 14 on the outside of chassis 16 become compressed as they assume jounce and the coil load springs 14 located on the inside of the turning chassis 16 during cornering become extended while experiencing rebound see FIG. 2. Coil load springs 14 on the unloading inside side of the cornering vehicle are trying to return to their free state as they extend. Thus coil load springs 14 as they extend exert a lifting force to chassis 16 which is exacerbating the roll angle of the body mass. The lifting force is exactly what is not desired and is resisted by the coil rebound springs 11 herein disclosed. The whole purpose of using coil rebound springs 11 is to reduce chassis 16 roll at initiation of and during cornering because rebound movement at any axle 15 will likewise be resisted.

Figure 3:
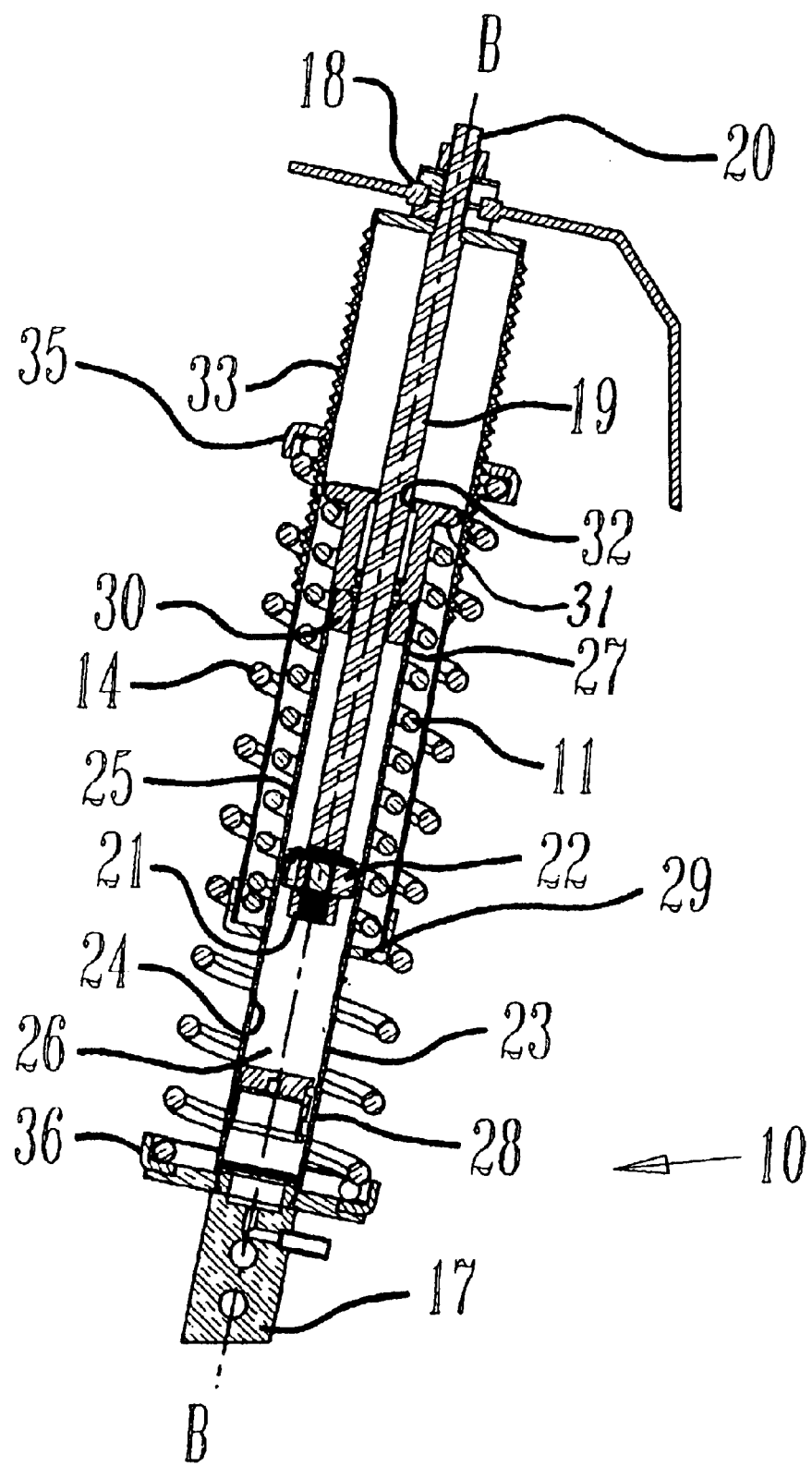
FIG. 3 is a side view in cross section of a typical combined shock absorber and strut type suspension unit, having a load spring but with the addition of the disclosed coil rebound spring thereabout.

FIG. 3 shows another rebound control shock absorber 10 having coil rebound spring 11 thereabout, but with the addition of a compression type suspension coil load spring 14. The additional compression coil load spring 14 carries the sprung weight and is intended to replace or supplement chassis 16 existing original equipment manufacturer suspension load spring 14, if any. If load spring 14 is carried on the rebound control shock absorber 10 and no separate load spring 14 is used the vehicle suspension would be fully self-contained. Thus the rebound control shock absorber 10 with an integral coil load spring 14 as per FIG. 3 would be able to serve as a replacement assembly providing that the vehicle mounting points for such an assembly is sufficient to respond and carry the loadings expected. Typically, strut mountings that are prevalent on modern cars and trucks are adequate for operation with the assembly shown in FIG. 3. It is important to note that coil rebound spring 11 seeks to control the sprung weight and the coil load spring 14 if original equipment manufacturer and/or on the rebound control shock absorber 10 as in FIG. 3 supports the sprung weight.

Figure 2:
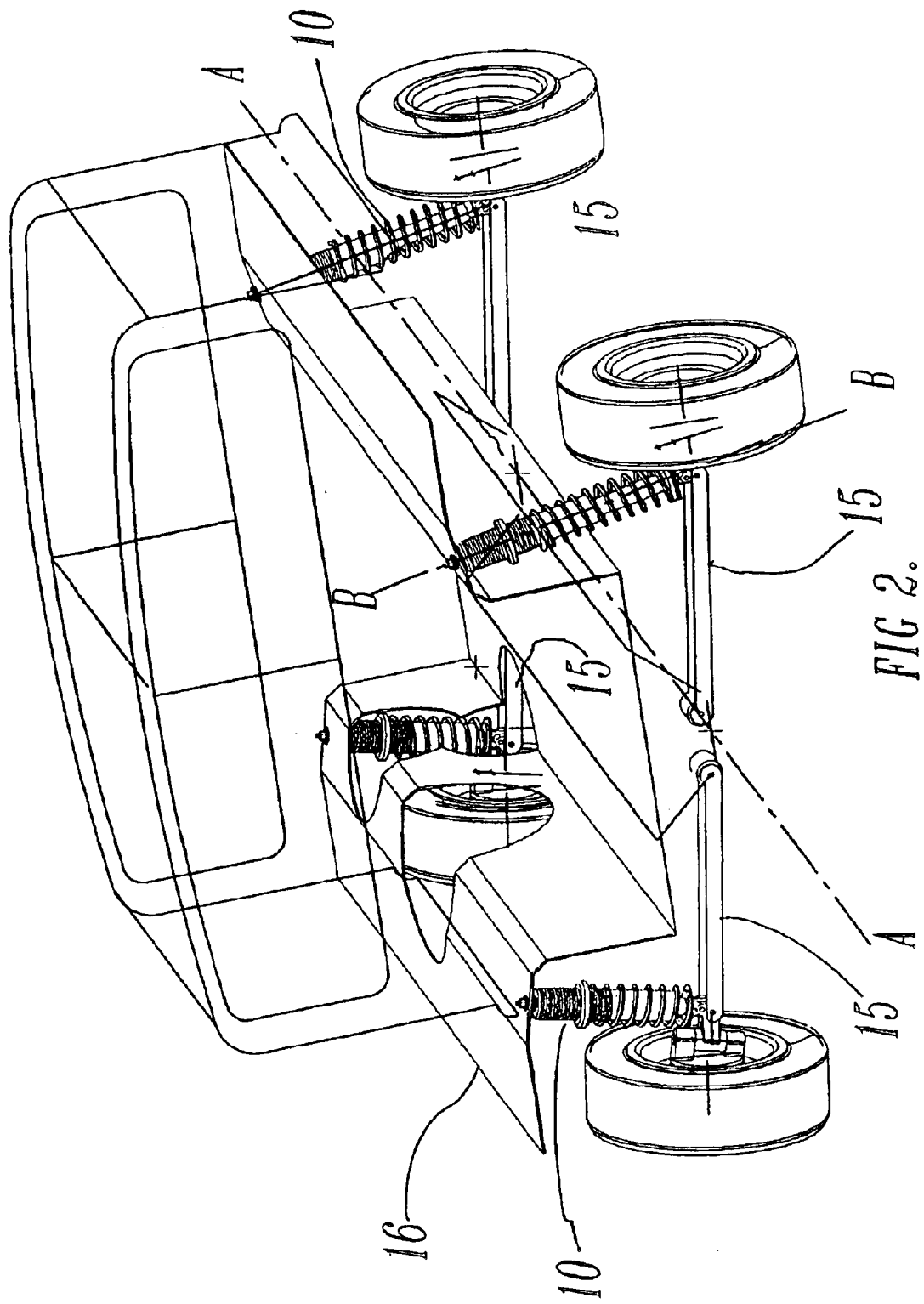
FIG. 2 is a schematic perspective view of a vehicle rounding a corner with roll depicted about its longitudinal axis A—A.

A rebound control shock absorber 10 for placement between axle 15 and chassis 16 is shown in FIGS. 1, 2 and 3. The rebound control shock absorber 10 is for additionally controlling the vehicle dynamics with increasing resistance under motion between a preloaded vehicle ride height position to a fully extended position of rebound control shock absorber 10 during rebound movement of chassis 16 away from axle 15 along an axis B—B through the rebound control shock absorber 10. It is rebound control shock absorber 10 that applies the unsprung weight of the wheels, brake and axle 15 to chassis 16 through coil rebound spring 11. The goal is not to lift the axle, wheel and its tire from the ground, if possible, during cornering but to apply the unsprung weight of those components at the lifting side of chassis 16 to resist roll of the chassis and body.

An axle mount 17 on axle 15 is provided to connect to rebound control shock absorber 10. A chassis attachment 18 on chassis 16 of the vehicle connects to the depending rebound control shock absorber 10 so that it may operate along axis B—B between axle mount 17 and chassis attachment 18. An elongated rod 19 has opposite ends 20 and 21 carried and aligned along the axis B—B. End 20 connects to chassis attachment 18 in FIG. 1 or 3. While rebound control shock absorber 10 is shown with elongated rod 19 and end 20 at the top in FIGS. 1 and 3, skilled artisans will understand that it can be inverted so that elongated rod 19 connects to axle mount 17. A fluid displacement piston 22 is located on end 21. If rebound control shock absorber 10 is inverted (not shown) then attention to how coil rebound spring 11 carries the unsprung weight must be addressed; again this is within the skill of artisans. Fluid displacement piston 22 is carried on the elongated rod 19 opposite its connection end 20. Likewise a tube 23 is aligned along the axis B—B and connects to the axle mount 17 when the end 20 is connected to the chassis attachment 18; alternatively, the tube 23 connects to chassis attachment 18 when the end 20 is connected to the axle mount 17.

Tube 23 has inside and outside cylindrical surfaces 24 and 25. Inside cylindrical surface 24 is sized diametrically for surrounding the fluid displacement piston 22 for sliding sealing circumferential engagement there between with reciprocation along the axis B—B. A chamber 26 is defined by the inside cylindrical surface 24 and chamber 26 carries damping fluid (not shown) about fluid displacement piston 22 for controlled resistance to sliding reciprocal movement of the fluid displacement piston 22 within tube 23 against the inside cylindrical surface 24 and along the axis B—B.

Coil rebound spring 11 is carried about outside cylindrical surface 25 of tube 23 coaxial thereto and for expansion and contraction along the axis B—B as in FIGS. 1 and 3. Coil rebound spring 11 is mounted to restrain expansion along the axis B—B of the rebound control shock absorber 10 between axle 15 and chassis 16 of the vehicle. Restraint is from at least the preloaded vehicle ride height position to the coil rebound spring 11 fully extended position during rebound motion of the axle 15 away from the chassis 16 as in FIG. 2.

Tub 23 is elongated along the axis B—B with a top 27 and a bottom 28 separated from each other. A flanged retainer 29 affixes about the outside cylindrical surface 25 of tube 23. Flanged retainer 29 is located between the top 27 and bottom 28 for applying axial rebound loads to tube 23 from rebound spring 11 during motion along axis B—B of the axle 15 away from chassis 16. A tube cap 30 mounts in the top 27 and extends from tube 23 to a seat 31 overhanging tube cap radially from the outside cylindrical surface 25 as shown in FIGS. 1 and 3.

A bore 32 positioned in and passing through tube cap 30 is coaxial with axis B—B and bore 32 allows elongated rod 19 to pass there through and reciprocate therein. Tube cap 30 connects axially to tube top 27 to capture coil rebound spring 11 between flanged retainer 29 and seat 31. The coil rebound spring is thereby supported for coaxially circumscribing tube 23 between top 27 and bottom 28 thereof. Rebound is resisted during expansion of rebound control shock absorber 10 from its preloaded height to full extension along the axis B—B with motion of axle 15 away from chassis 16.

A cylindrical housing 33 in FIGS. 1 and 3 is affixed to the end 20 connected to either chassis 16 or axle 15 depending on the orientation of rebound control shock absorber 10. Cylindrical housing 33 extends from its affixed connection along the axis B—B to engage flanged retainer 29. Cylindrical housing 33 has a circular cross section sized diametrically for surrounding coil rebound spring 11 with a clearance there between. In FIG. 3 the cylindrical housing 33 is shown with external threads. A fastener 34 on tube cap 30 adjacent seat 31 is shaped to retain coil rebound spring 11 to seat 31 during movement of coil rebound spring 11 along the axis B—B with motion of axle 15 away from chassis 16. The coil rebound spring 11 is preloaded by the flanged retainer when the coil rebound spring is captured between flanged retainer 29 and seat 31. During expansion of the rebound control shock absorber 10 from its preloaded position, the coil rebound spring resists expansion under motion of axle 15 away from chassis 16.

Coil load spring 14 mounts co-axially about cylindrical housing 33 for carrying chassis 16 of the vehicle from the preloaded ride height position to a full jounce position compressing the coil load spring 14 as shown graphically in FIG. 2. An upper collar 35 about cylindrical housing 33 is near connection end 20 and a lower collar 36 at tube bottom 28 capture coil load spring 14 so rebound spring 11 substantially resists expansion after coil load spring 14 substantially resists compression during rebound and jounce, respectively. The term, "after" is used in the preceding sentence because rebound spring 11 and coil load spring 14 operate independently to control (resist) different loads.

A method for rebound control by rebound control shock absorber 10 placed between axle 15 and chassis 16 of a vehicle is operable at least between a preloaded vehicle ride height position to a fully extended position during rebound movement of axle 15 away from chassis 16 along axis B—B. The method of rebound control has the steps of mounting rebound control shock absorber 10 to axle mount 17, and attaching rebound control shock absorber 10 to chassis attachment 18 along axis B—B there between. Another step connects elongated rod 19 having opposite ends 20 and 21 so end 20 connects to either axle mount 17 or chassis attachment 18. Locating piston 22 at the opposite end and connecting tube 23 to axle mount 17 if the elongated rod 19 is connected to chassis attachment 18 or connecting tube 23 to chassis attachment 18 if the elongated rod 19 is connected to the axle mount 17 are steps. The step of sizing tube 23 with a cross section to surround piston 22 for sliding sealing circumferential engagement within tube 23 due to motion of axle 15 away from chassis 16 is performed. Carrying damping fluid about piston 22 in chamber 26 defined by tube 23 is a step. The steps of controlling resistance to sliding reciprocal movement of piston 22 in tube 23 with the damping fluid, and carrying rebound spring 11 about tube 23 for restraining expansion of the rebound control shock absorber 10. Restraining is between axle 15 and chassis 16 of the vehicle from the preloaded vehicle ride height position to the fully extend position along the axis B—B during rebound movement of axle 15 away from chassis 16 are followed.

Figure 4:
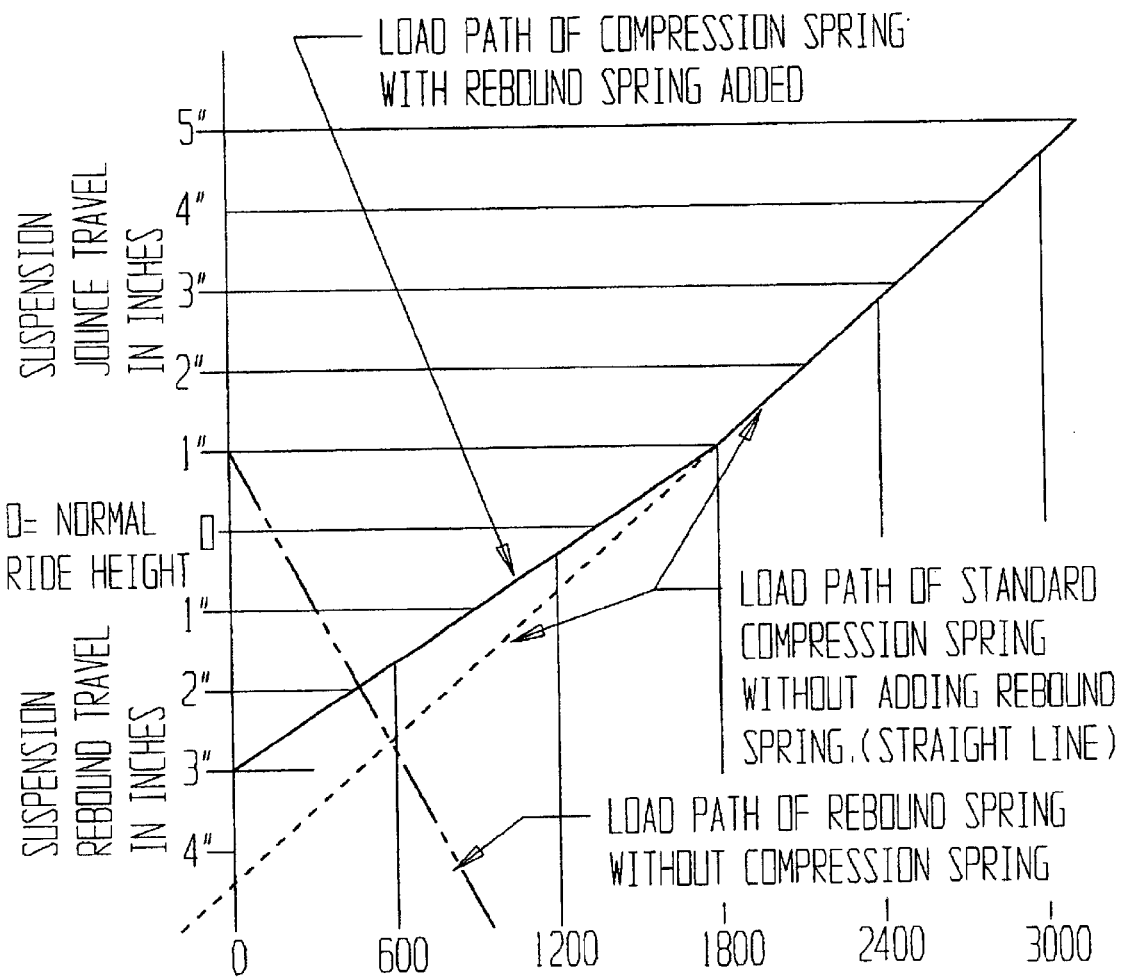
FIG. 4 is a graph showing the travel relative to the jounce and rebound loads of the combined shock absorber and strut depicted in FIG. 3.

The step of supporting rebound spring 11 coaxially circumscribing tube 23 so that rebound is resisted during expansion of rebound control shock absorber 10 from its preloaded height to full extension along the axis B—B with motion of axle 15 away from chassis 16 is done. The step of supporting load spring 14 relative to rebound spring 11 coaxial to one another and along the axis B—B with a clearance there between occurs. During expansion of rebound control shock absorber 10 from its preloaded vehicle height to full extension along the axis B—B there is motion of axle 15 away from chassis 16 load spring 14 and the rebound spring 11 operate substantially independent of one another to resist jounce and rebound, respectively. The method for rebound control by rebound control shock absorber 10 with the step of supporting rebound spring 11 and load spring 14 at the preloaded vehicle height so that the working force application travel there between is overlapping. Thus, about one inch of travel overlap during movement of the rebound spring 11 along the axis B—B with motion of axle 15 away from chassis 16 from the preloaded vehicle height is thus preformed. FIG. 4 shows in graphic form the resultant of overlap for rebound spring 11 and the load spring 14 combined. In the graph of FIG. 4 the load paths at a rate of 320 pound per inch compression jounce spring and a rate of 160 pounds per inch rebound counter spring are shown. The affect on the rebound travel spring of the suspension if engaged at one inch of jounce is no curve at the transition point.

The step of having the ratio of the spring constants of coil rebound spring 11 to the spring constant of load spring 14 be less than one. So that during expansion of rebound control shock absorber 10 from its preloaded position coil rebound spring 11 happens to resist expansion under motion of axle 15 away from chassis 16 to a lesser extent than load spring 14 resists jounce. The step of coil rebound spring 11 applying force to resist rebound of the axle 15 occurs.

The method for rebound control by rebound control shock absorber 10 has the step of locating coil rebound spring 11 to substantially resist expansion of rebound control shock absorber 10. The step of co-axially positioning coil load spring 14 to substantially resist compression of rebound control shock absorber 10 during rebound and jounce is performed independently.

While the examples illustrating rebound control shock absorber 10 and rebound spring 11 are disclosed and described, skilled artisans will appreciate that many variations for the addition of rebound spring 11 will be possible. The specific examples should not be considered limiting and the particular arrangements shown in FIGS. 1 and 2 are merely for depiction of but some examples of form. In that regard, in the claims that follow the orientation of rebound control shock absorber 10 is either up or down and angled mounting thereof is also within the scope of the claims.

What is claimed is:

1. A rebound control shock absorber for placement between an axle and a chassis of a vehicle, the rebound control shock absorber for additionally controlling the vehicle dynamics with increasing resistance under motion between a preloaded vehicle ride height position to a fully extended position during rebound movement of the chassis away from the axle along an axis through the rebound control shock absorber, the rebound control shock absorber comprising:

a) an axle mount on the axle of the vehicle and a chassis attachment on the chassis;

b) an elongated rod having opposite ends aligned along the axis, the elongated rod connected by one end to either the axle mount or the chassis attachment;

c) a fluid displacement piston located on the end opposite to the one end, the fluid displacement piston carried on the elongated rod opposite the one end;

d) a tube aligned along the axis and connected to the axle mount if the one end is connected to the chassis attachment or to the chassis attachment if the one end is connected to the axle mount, the tube having inside and outside cylindrical surfaces, the inside cylindrical surface sized diametrically for surrounding the fluid displacement piston for sliding sealing circumferential engagement there between and for reciprocation along the axis;

e) a chamber defined within the inside cylindrical surface, the chamber carrying damping fluid about the fluid displacement piston for controlled resistance to sliding reciprocal movement of the fluid displacement piston within the tube against the inside cylindrical surface and along the axis;

f) a coil rebound spring carried about the outside cylindrical surface of the tube coaxial to and for expansion and contraction along the axis, the coil rebound spring mounted to restrain expansion along the axis of the rebound control shock absorber between the axle and the chassis from at least the preloaded vehicle ride height position to the fully extended position during rebound motion of the chassis away from the axle;

g) a flanged retainer affixed about the outside cylindrical surface of the tube, located between a top and a bottom of the tube and affixed for applying axial rebound loads to the tube from the coil rebound spring during motion of the chassis away from the axle;

h) a tube cap mounted in the top and extending from the tube inside cylindrical surface to a seat radially overhanging the tube cap beyond the outside cylindrical surface, and i) a bore passing through the tube cap positioned along the axis allows the elongated rod to pass there through and reciprocate therein, the tube cap connecting axially to the tube top to capture the coil rebound spring between the flanged retainer and the seat, the coil rebound spring thereby supported for coaxially circumscribing the tube so that rebound is resisted during expansion of the rebound control shock absorber from at least a preloaded height to full extension along the axis with motion of the chassis away from the axle.

2. The rebound control shock absorber of claim 1 further comprising a cylindrical housing affixed to the one end, the cylindrical housing extending from the one end along the axis to engage the flanged retainer, the cylindrical housing having a circular cross section sized diametrically for surrounding the coil rebound spring with a clearance there between.

3. The rebound control shock absorber of claim 2 wherein the coil rebound spring is preloaded by the flanged retainer when the coil rebound spring is captured between the flanged retainer and the seat so that during expansion of the rebound control shock absorber from its preloaded position the coil rebound spring resists expansion under motion of the chassis away from the axle.

4. The rebound control shock absorber of claim 2 wherein a coil load spring mounts co-axially about the cylindrical housing for carrying the chassis of the vehicle from the preloaded ride height position to a full jounce position while compressing the coil load spring.

5. The rebound control shock absorber of claim 4 wherein an upper collar about the cylindrical housing near the one end and a lower collar about the tube captures the coil load spring so that the coil rebound spring substantially resists expansion and the coil load spring substantially resists compression during rebound and jounce respectively.

6. The rebound control shock absorber of claim 1 further comprising a fastener on the tube cap adjacent the seat for retaining the coil rebound spring to the seat during movement of the coil rebound spring along the axis with motion of the chassis away from the axle.

* * * * *